United States Patent [19]

Legueu

[11] 4,270,765
[45] Jun. 2, 1981

[54] CHASSIS-CAB AUTOMOTIVE VEHICLE WITH A DOUBLE REAR AXLE

[76] Inventor: Paul Legueu, 85 av. de Mazy, 44380 Pornichet, France

[21] Appl. No.: 73,388

[22] Filed: Sep. 7, 1979

[30] Foreign Application Priority Data

Mar. 26, 1979 [FR] France ............................ 79 07511

[51] Int. Cl.$^3$ .............................................. B60P 9/00
[52] U.S. Cl. .................................... 280/137; 280/697
[58] Field of Search ............... 280/137, 692, 697, 718, 280/691

[56] References Cited

U.S. PATENT DOCUMENTS

| | | | |
|---|---|---|---|
| 1,629,597 | 5/1927 | Stockford | 280/718 X |
| 1,881,408 | 10/1932 | Le Moon | 280/718 X |
| 1,946,060 | 11/1931 | Buckendale | 280/124 |
| 2,078,521 | 4/1937 | Alden | 280/124 |
| 2,084,320 | 6/1937 | Coleman | 280/692 |
| 2,096,530 | 10/1937 | Alden | 280/124 |
| 2,135,291 | 11/1938 | Pinard | 280/718 X |
| 2,633,204 | 3/1953 | Keller | 180/22 |
| 2,951,709 | 9/1960 | Ward | 280/104.5 |
| 3,033,589 | 5/1962 | Behnke | 280/104.5 |
| 3,960,389 | 6/1976 | Narahari | 280/697 |
| 3,964,735 | 6/1976 | Wright et al. | 280/697 X |
| 4,065,153 | 12/1977 | Pringle | 280/718 X |

FOREIGN PATENT DOCUMENTS

| | | | |
|---|---|---|---|
| 1047033 | 12/1958 | Fed. Rep. of Germany | 280/137 |
| 419475 | 11/1934 | United Kingdom | 280/137 |
| 678580 | 9/1952 | United Kingdom | 280/137 |
| 1023228 | 3/1966 | United Kingdom | 280/137 |

OTHER PUBLICATIONS

Abstracts French Publications 2,347,250 & 2,254,206.

*Primary Examiner*—John J. Love
*Assistant Examiner*—Norman L. Stack, Jr.
*Attorney, Agent, or Firm*—Kenyon & Kenyon

[57] ABSTRACT

Disclosed is an air-transportable and highly autonomous vehicle of the type comprising a single-unit chassis supported in the front by a set of driving and steering wheels and at the rear by two axles to which suspension leaf-springs are coupled. The leaf-springs may slide longitudinally relative to the axles. The stack of leaves is carried in its transverse median plane by an equalizer mechanism which is angularly movable on the end of a pivotal shaft. In this vehicle, each end of a pivotal arm (17) is carried in a fixed sleeve (18) with which it is rendered rigid, the sleeve being extended downwardly by a member (20) for fixing one of the ends ($21_1$) of a part (21) of the reaction links. This sleeve is surmounted by an equalizer support (22) which is also fixed and receives the ends ($23_1$) of the other part (23) of the links, the free ends ($21_2$-$23_2$) of all of the links (21-23) being assembled with supports which are fixed against rotation and clamped to the two axles (16). The suspension leaf-springs (15) are fixed to a base (31) which is mounted to be angularly movable on rolling bearings (32) carried by the two ends of the pivotal shaft (16).

13 Claims, 4 Drawing Figures

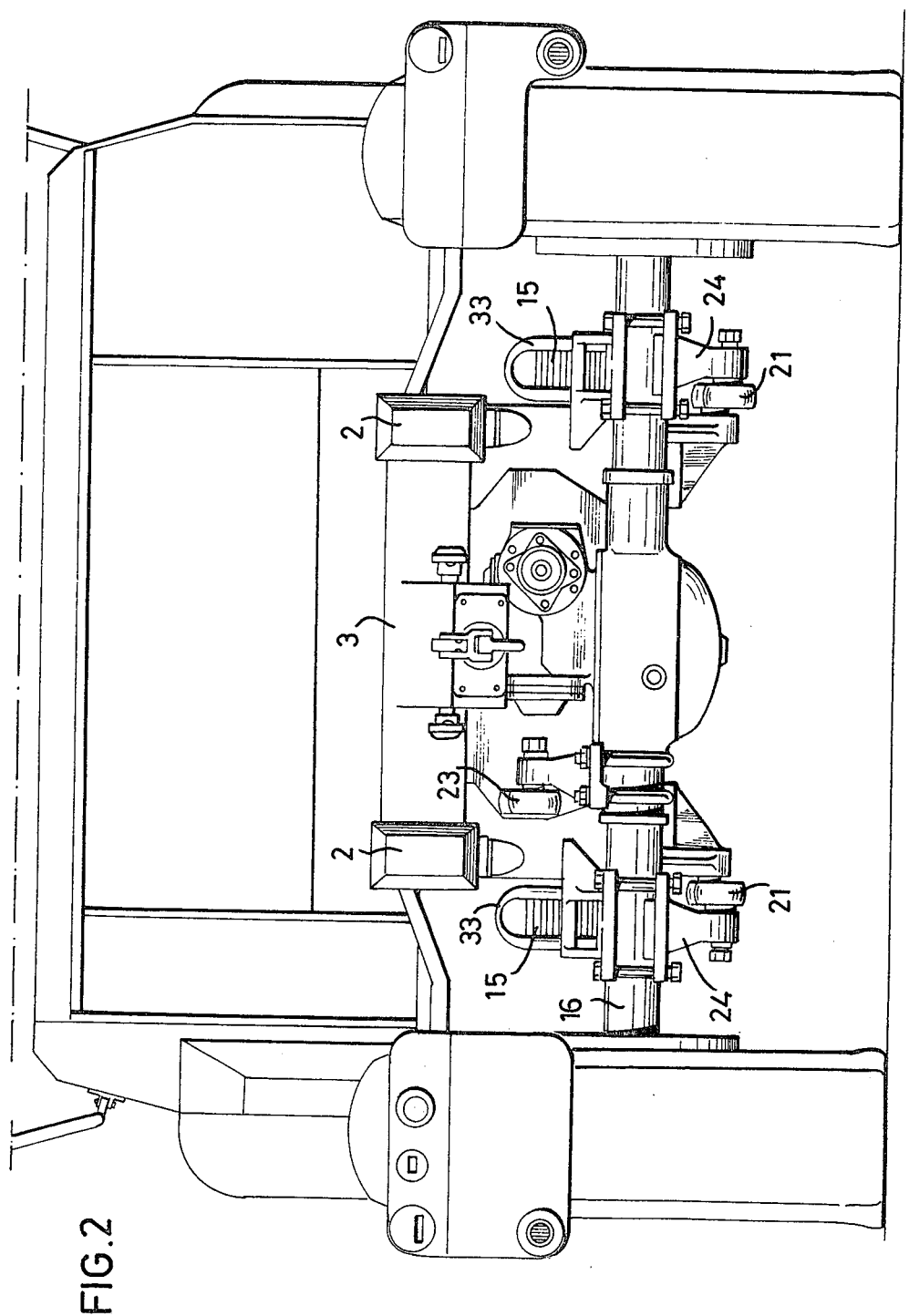

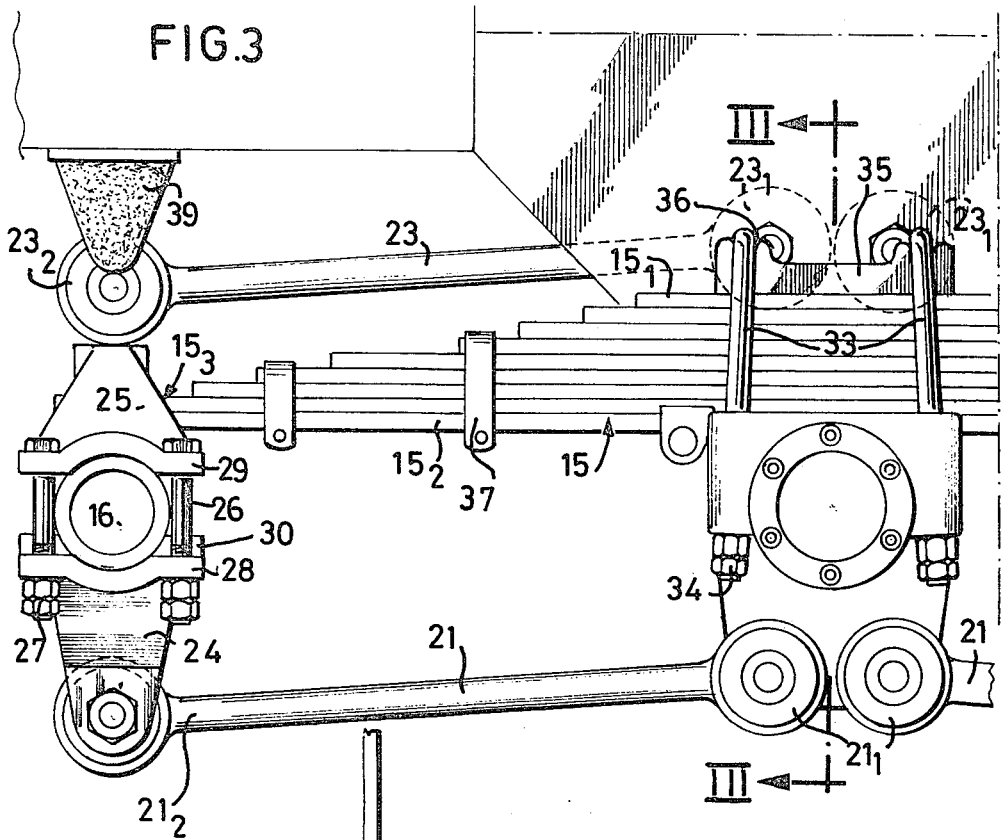
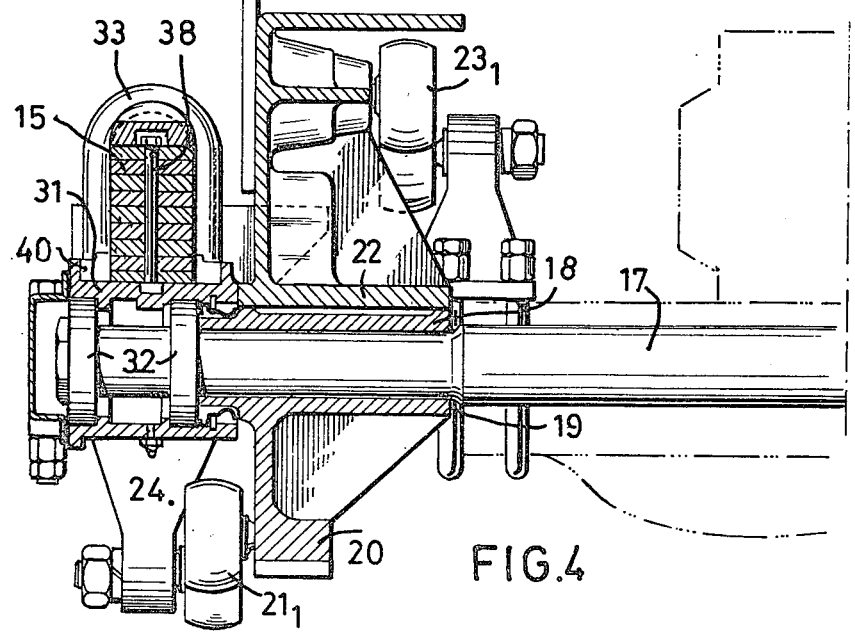

CHASSIS-CAB AUTOMOTIVE VEHICLE WITH A DOUBLE REAR AXLE

BACKGROUND OF THE INVENTION

The invention relates to an automotive vehicle having a chassis and cab in one piece supported at the front by a set of driving and steering wheels and at the rear by two axles which may or may not be driving axles, the vehicle being highly autonomous for use in particular in desert regions which are poorly supplied with water or fuel and especially being air-transportable for rapid deployment, the basic vehicle structure being useful for vehicles for transporting troops, material, military equipment, or for ambulances, workshop vans or the like.

A vehicle having a double rear axle is well known in particular in the utility vehicle field and usually comprises a rigid chassis formed by longitudinal members assembled by welded cross-members and on which a driving cab is fixed, the chassis being supported in the front by a set of driving and steering wheels and at the rear by two independent axles.

It is also known to mount the suspension leaf-springs on a pivotal unit formed by a pivot shaft and reaction links which connect the axles to the pivotal mechanism. There are usually six links, one pair of links being provided at each end of the pivotal arm which extends throughout the width of the vehicle in a plane perpendicular to its length, these links being located within the region of the leaf springs and the axles, another pair of complementary links being provided above the leaf springs so that the upper and lower links connected to the two axles and to the pivotal mechanism substantially form in space a deformable parallelogram structure.

SUMMARY OF THE INVENTION

The object of the invention is to provide with this known structure a vehicle which is air-transportable and has a long range of operation, that is to say, is highly autonomous as concerns fuel and water and yet has two axles allowing the transportation of large loads. The presence of the two axles at the rear is indeed somewhat incompatible with an air-transportable vehicle, that is to say, a vehicle which is relatively light, or with a highly-autonomous vehicle which implies the use of large capacity-tanks since, in this case, the axles and their associated differentials and possibly transmission shafts, consititute obstacles to the placement of such water and fuel tanks.

The invention overcomes this problem by providing a single-unit chassis which is cranked twice in the region of the driving cab so that it is possible to lower the cab while providing a large ground clearance in the region of the front and rear axles so that, notwithstanding the presence of two axles and their associated differential and possibly transmission shafts, it is easy to place under the rear platform of the chassis a flat water tank which extends practically throughout the length of this platform, and, on the lateral sides of the water tank (which does not take up the entire width of the platform), large-capacity fuel tanks which render the vehicle highly autonomous.

Moreover, the suspension of the two rear axles has been arranged to be particularly soft since the coupling of the axles by the leaf springs is completed by reaction links, as indicated in the ensuing description and the accompanying drawings.

BRIEF DESCRIPTION OF THE DRAWINGS

FIG. 2 is a rear view of the vehicle of FIG. 1.

FIG. 3 is a side view showing a detail of the rear suspension of the vehicle of FIG. 1.

FIG. 4 is a sectional view taken along line III—III of FIG. 3.

DESCRIPTION OF THE PREFERRED EMBODIMENT

Figure 1:
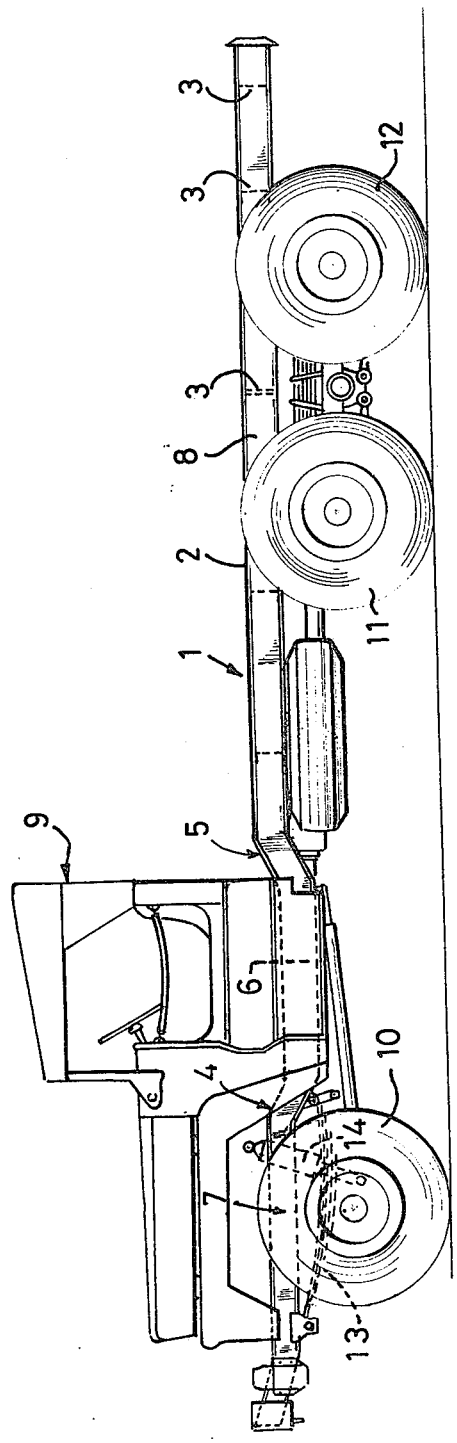
FIG. 1 is a diagrammatic view of the vehicle according to the invention.

As mentioned above, the vehicle comprises a chassis 1 formed by longitudinal members 2 which are assembled by welded cross-members 3, this chassis having the feature of being cranked twice at 4 and 5 so that the section 6 of the chassis is located at a lower level than the sections 7 and 8 which respectively support the engine unit and constitute the loading platform.

In this way, the cab 9 is lowered and this facilitates access to this cab whereas the sections 7 and 8 which receive the front set of wheels 10 and the two rear axles 11 and 12 are, on the contrary, raised so as to increase the ground clearance and allow the placement of two driving means for the sets of wheels and the placement of water and fuel tanks (which have not been shown in order to render the drawings more clear). The water tank, which extends practically throughout the length of the section 8 of the chassis, is of a flat parallel-sided shape and is fixed in the longitudinal median plane of the chassis so as to leave spaces on each side of the tank for receiving the fuel tanks.

The suspension of the front set of wheels is conventional and comprises leaf-springs 13 and telescopic shock-absorbers 14.

The two rear axles also comprise leaf-springs 15 but the latter are mounted in an inverted position so that the smallest leaves $15_1$ form the top of the stack of leaves whereas the longest leaves $15_2$ form the base of this stack which directly bears at its ends $15_3$ on the two axles 16 as can be seen in FIG. 3. In this Figure only a part of the leaf-spring has been shown since the other part is symmetrical.

This type of suspension is in fact formed by two structures one of which is fixed to the chassis of the vehicle while the other is movable relative to the one structure so that variations in the levels of the two rear axles are counterbalanced by the leaf-springs and a pivotal mechanism.

The fixed structure comprises a pivot shaft 17 which is fixed against rotation and supported at each of its ends in a sleeve 18 with which it is rendered rigid by welding 19, this sleeve being downwardly extended by a member or flange 20 for fixing the ends $21_1$ of the lower links 21. This sleeve 18 is surmounted by an equalizer support 22 which is rigid with the chassis 1 of the vehicle and which also serves to fix the ends $23_1$ of the upper links 23.

Thus the four lower links 21 and the two upper links 23 (since the latter are provided only on one side of the pivotal arm), are connected at one of their ends to the fixed part of the suspension. The other ends $21_2$ and $23_2$ of the lower and upper links 21 and 23 are assembled with lower and upper link supports 24 and 25 which are mounted on the axles 16 by bolts 26 and nuts and locknuts 27, these bolts extending through flanges 28 and 29 provided on the two link supports. In order to ensure that these two link supports 24 and 25 turn with respect to the axle 16, the latter is provided with abutment 30 which is welded to the axle and bears against the flange 28 of the lower support 24 of the links 21. The ends $21_2$ and $23_2$ of the links 21 and 23 are consequently rendered rigid with the axles and thus move in a vertical plane in following the movement of the axles.

The moving structure or pivotal mechanism comprises a spring base 31 which is independent of the sleeve 18 or of the equalizer support 22 (which are fixed against translation and rotation), this base being mounted to be angularly movable on rolling bearings 32 provided at each end of the pivotal shaft 17. This spring base 31 supports the leaf-springs 15 which are maintained assembled by U-bars 33 fixed by bolts 34.

These U-bars bear at their upper part against upper positioning plates 35 provided with notches 36 which act as seats for the U-bars so as to maintain them in position. The stack of leaf-springs is held together by auxiliary U-bars 37 and by studs 38 which extend through the stack of leaves. The leaves carried by the spring base 31 can consequently move angularly on the two ends of the pivotal shaft when the axles move, the leaves being in sliding bearing contact with the upper supports 25 of the links.

The leaves 15 are moreover held together by abutments 40 located on each side of the bottom of the stack of leaves, these abutments being clamped by blocking screws (not shown).

Consequently, the leaf-springs follow the movements of the axles by an angular displacement about the pivot shaft, and the reaction links rigid with these two axles, but assembled with the fixed part of the suspension, ensure the balancing of the assembly by counter-reaction. The chassis has end-of-travel abutments 39, for example of Paulstra, which oppose an excessive upward travel of the axles 16.

This suspension is consequently soft and balanced and in this way imparts to the vehicle maximum comfort, which is an important advantage when the vehicle is intended to transport personnel or sophisticated precisely regulated equipment.

It must be understood that the scope of the invention is not intended to be limited to the embodiment described hereinbefore, in respect of which other modifications and other means may be provided without departing from the scope of the invention as defined in the claims.

I claim:

1. In an automotive vehicle comprising a single unit chassis supported in the front by an axle and associated wheels and in the rear by two longitudinally spaced axles and associated wheels, a stack of leaf-springs coupled to and extending between both rear axles on one side of the vehicle and another stack of leaf-springs coupled to and extending between both rear axles on the other side of the vehicle, each stack of leaf-springs being carried in its transverse median plane by an equalizer mechanism pivotally mounted on an end of a pivot shaft, the pivot shaft being fixed against rotation and rigid with an equalizer support fixed to the chassis of the vehicle, the two rear axles being located on each side of and at equal distances from the pivot shaft and being movably connected to the equalizer mechanism by at least one upper and at least one lower reaction link for each stack, the improvement comprising for each stack of leaf-springs a sleeve fixed to the chassis, an end of the pivot shaft extending into the sleeve and being rigidly connected thereto and supported therein, the sleeve including a downwardly extending portion to which one end of the lower reaction link for the respective stack is connected, an equalizer support surmounting the sleeve, the equalizer support being fixed to the chassis and receiving one end of the upper reaction link for a respective stack, an additional support non-rotatably connected to each rear axle to which is coupled the free end of the upper and lower reaction links for a respective stack, and a base pivotally connected to the pivot shaft, the respective stack of leaf-springs being connected to the respective base to pivot about the pivot shaft.

2. The improvement according to claim 1 and including roller bearings for pivotally connecting each base to the pivot shaft.

3. The improvement according to claim 1, wherein each sleeve supporting an end of the pivot shaft and its downwardly extending portion are a one-piece molded part, each equalizer support surmounting a respective sleeve being independent of that sleeve and including bosses for receiving the upper reaction link.

4. The improvement according to claim 1, wherein the leaf-springs are mounted in the stack in inverted fashion with the shortest leaf on top and including inverted U-members and blocking means for connecting the stack to a base.

5. The improvement according to claim 4 and including upper plates disposed between the U-members and the upper leaf-spring, the plates having notches therein for receiving the U-members.

6. The improvement according to claim 4 and including abutments located on each side of the lower of the leaves in a stack and means for clamping the abutments in the longitudinal direction of the leaves, and additional U-members cooperating with the abutments for holding the leaves together.

7. The improvement according to claim 1 and including upper supports non-rotatably connected to the axles, the upper supports including means for slidably receiving and supporting ends of the suspension stacks.

8. The improvement according to claim 7 and including lower supports, the upper and lower supports including flanges, means extending through the flanges to connect the upper and lower supports to a respective axle, radial abutments being provided on the axles to prevent rotation of the supports.

9. The improvement according to claim 7 and including abutment-shock absorbers fixed to the chassis above the axles for limiting upward travel of the axles.

10. The improvement according to claim 1, wherein the chassis includes two cranked parts intermediate the ends thereof and providing a section of the chassis which is lower than a front and a rear section of the chassis, a vehicle cab being disposed on the lowered section of the chassis.

11. The improvement according to claim 10, and including a flat large-capacity tank disposed under substantially the length of the rear of the chassis in the central region thereof and an additional tank disposed on each side of said flat, large-capacity tank.

12. The improvement according to claim 1, wherein the vehicle includes for each stack an upper reaction link and two lower reaction links.

13. The improvement according to claim 1, wherein the front wheels are driven.

* * * * *